United States Patent

Shafi et al.

(10) Patent No.: US 6,938,146 B2
(45) Date of Patent: Aug. 30, 2005

(54) MEMORY POWER MANAGEMENT USING PREFETCH BUFFERS

(75) Inventors: Hazim Shafi, Austin, TX (US); Sivakumar Velusamy, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 10/324,512

(22) Filed: Dec. 19, 2002

(65) Prior Publication Data

US 2004/0123042 A1 Jun. 24, 2004

(51) Int. Cl.⁷ ............................................. G06F 12/00
(52) U.S. Cl. ........................................................ 711/213
(58) Field of Search ........................... 711/113, 137, 711/213; 713/323, 324

(56) References Cited

U.S. PATENT DOCUMENTS 5,719,800 A * 2/1998 Mittal et al. ................. 713/321
5,901,103 A * 5/1999 Harris et al. ................. 365/226
6,014,751 A * 1/2000 Kardach et al. ............. 713/324

* cited by examiner

Primary Examiner—T Nguyen
(74) Attorney, Agent, or Firm—Casimer K. Salys; Dillon & Yudell LLP

(57) ABSTRACT

A system and method for improving memory performance and decreasing memory power requirements is described. To accomplish the improvements, a prefetch buffer is added to a memory controller with accompanying prefetch logic. The memory controller first attempts to satisfy memory requests from the prefetch buffer allowing the main memory to stay in a reduced power state until accessing it is required. If the memory controller is unable to satisfy a memory request from the prefetch buffer, the main memory is changed to an active power state and the prefetch logic is invoked. The prefetch logic loads the requested memory, returns the request memory to the requester, and loads memory likely to be requested in the near future into the prefetch buffer. Concurrent with the execution of the prefetch logic, the memory controller returns the requested data. Following the retrieval from main memory, the memory controller may place the main memory into a reduced power state immediately, or after a selected interval, based upon the likelihood of a subsequent memory request miss.

14 Claims, 3 Drawing Sheets

MEMORY POWER MANAGEMENT USING PREFETCH BUFFERS

BACKGROUND OF THE INVENTION

1. Technical Field

The present invention relates to computer data systems, more particularly to memory controllers, and still more particularly to an improved method and system for reducing memory power consumption while increasing memory performance.

2. Description of the Related Art

Memory banks in computer systems consume a significant portion of a computer system's power. Although memory components usually support multiple power reduction modes (e.g., Self Refresh and Power Down in SDRAM), such support is typically not utilized in systems. Simple power reduction techniques that power down memory banks after completing a request are not attractive because of the performance penalty associated with waking up the memory at the next request.

Therefore, there is a need for a system and method to allow the utilization of power reduction techniques for memory while reducing the associated performance penalty.

SUMMARY OF THE INVENTION

It is, therefore, an object of the invention to provide a system and method for reducing the power utilization of memory without incurring a significant performance penalty.

It is a further object of the invention to provide a system and method for reducing the power utilization of memory while increasing the performance of memory.

In accordance with one aspect of the present invention, a system and method for improving memory performance and decreasing memory power requirements is described. To accomplish the improvements, a prefetch buffer is added to a memory controller with accompanying prefetch logic. The memory controller first attempts to satisfy memory requests from the prefetch buffer allowing the main memory to stay in a reduced power state until accessing it is required. If the memory controller is unable to satisfy a memory request from the prefetch buffer, the main memory is changed to an active power state and the prefetch logic is invoked. The prefetch logic loads the requested memory, returns the request memory to the requester, and loads memory likely to be requested in the near future into the prefetch buffer. Concurrent with the execution of the prefetch logic, the memory controller returns the requested data. Following the retrieval from main memory, the memory controller may place the main memory into a reduced power state immediately, or after a selected interval, based upon the likelihood of a subsequent memory request miss.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
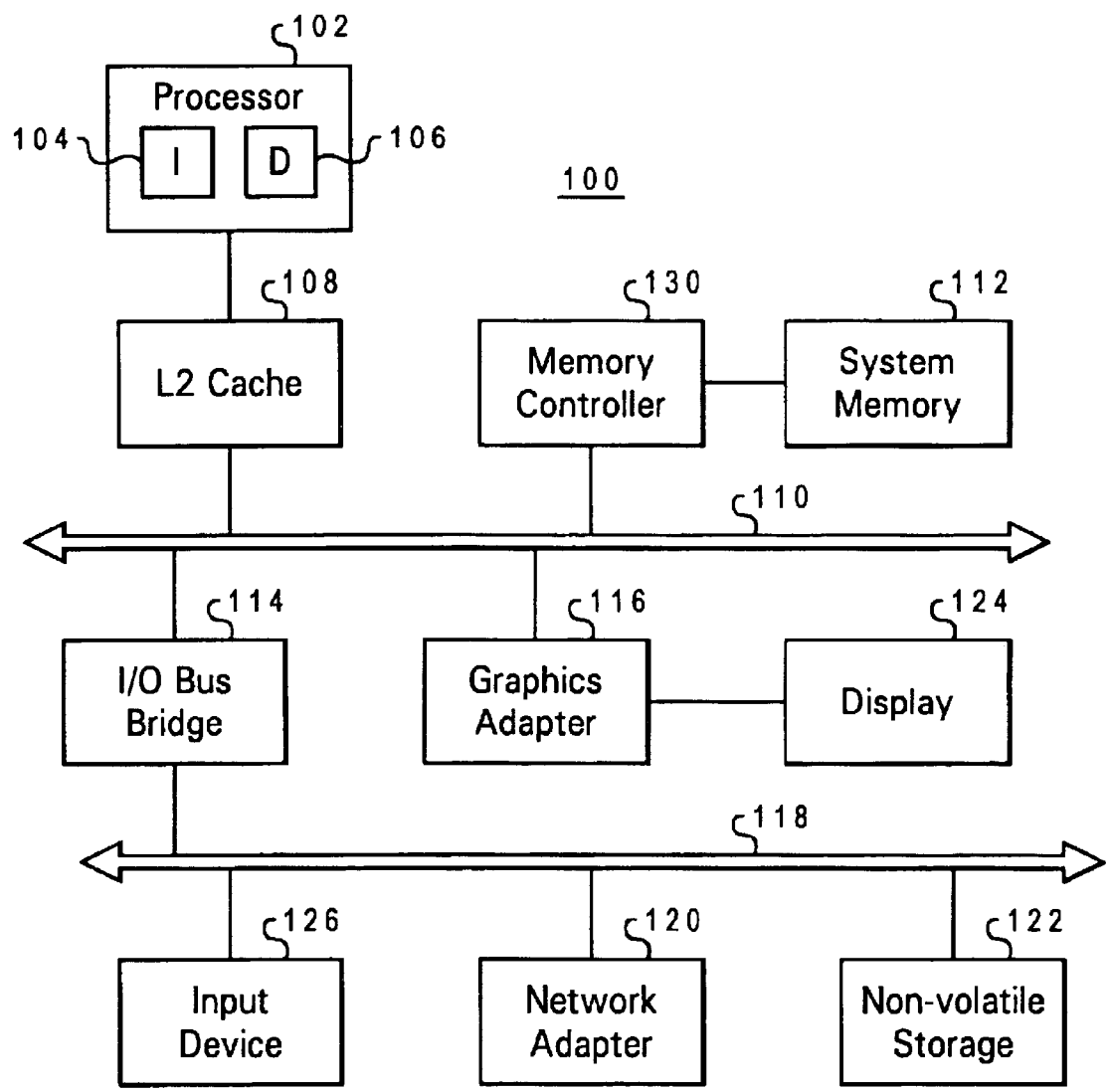
FIG. 1 is a block diagram of a computer system for carrying out reduced power operation of memory.

With reference now to the figures, and in particular with reference to FIG. 1, a data processing system 100, capable of communication with a network (not shown), is depicted in accordance with a preferred embodiment of the present invention. Data processing system 100 may be, for example, one of the models of personal computers or servers available from International Business Machines Corporation of Armonk, N.Y. Data processing system 100 may include only a single processor or may be a multiprocessor (MP) system including a plurality of processors. A single processor system is shown in the example depicted. A second processor (not shown) may be added to the system depicted, either with a separate L2 cache or sharing L2 cache 108 with processor 102. Processor 102 may be a superscalar reduced instruction set computer (RISC) processor including separate Level One (L1) instruction and data caches 104 and 106 within the processor.

Processor 102 is connected to Level Two (L2) cache 108. L2 cache 108 is connected to system bus 110 for data processing system 100. System memory 112 is also connected to system bus 112 through memory controller 130, as is Input/Output (I/O) bus bridge 114. I/O bus bridge 114 couples I/O bus 118 to system bus 110, relaying and/or transforming data transactions from one bus to the other. Other devices may also be connected to system bus 110, such as memory-mapped graphics adapter 116, which provides user interface information to a display 124.

I/O bus bridge 114 is connected to I/O bus 118, which may be connected to a variety of other devices such as an input device 126, which may be a conventional mouse, a trackball, a keyboard, or the like, and a non-volatile storage 122, such as a hard drive, a compact disk read-only memory (CD-ROM) drive, a digital video disk (DVD) drive, or similar like storage devices.

Also connected to I/O bus 118 is network adapter 120, which provides a logical interface with a network, which may be a local area network (LAN), wide area network (WAN), the Internet or other network that affords communication with data processing system 100.

The exemplary embodiment shown in FIG. 1 is provided solely for the purpose of explaining the invention, and those skilled in the art will recognize that numerous variations are possible, both in form and function. For instance, data processing system 100 may include a sound card and audio speakers, other I/O devices and communication ports, and numerous other components. In addition, the present invention could be carried out in a system that integrates a memory controller with a processor. All such variations are believed to be within the scope and spirit of the present invention.

Figure 2:
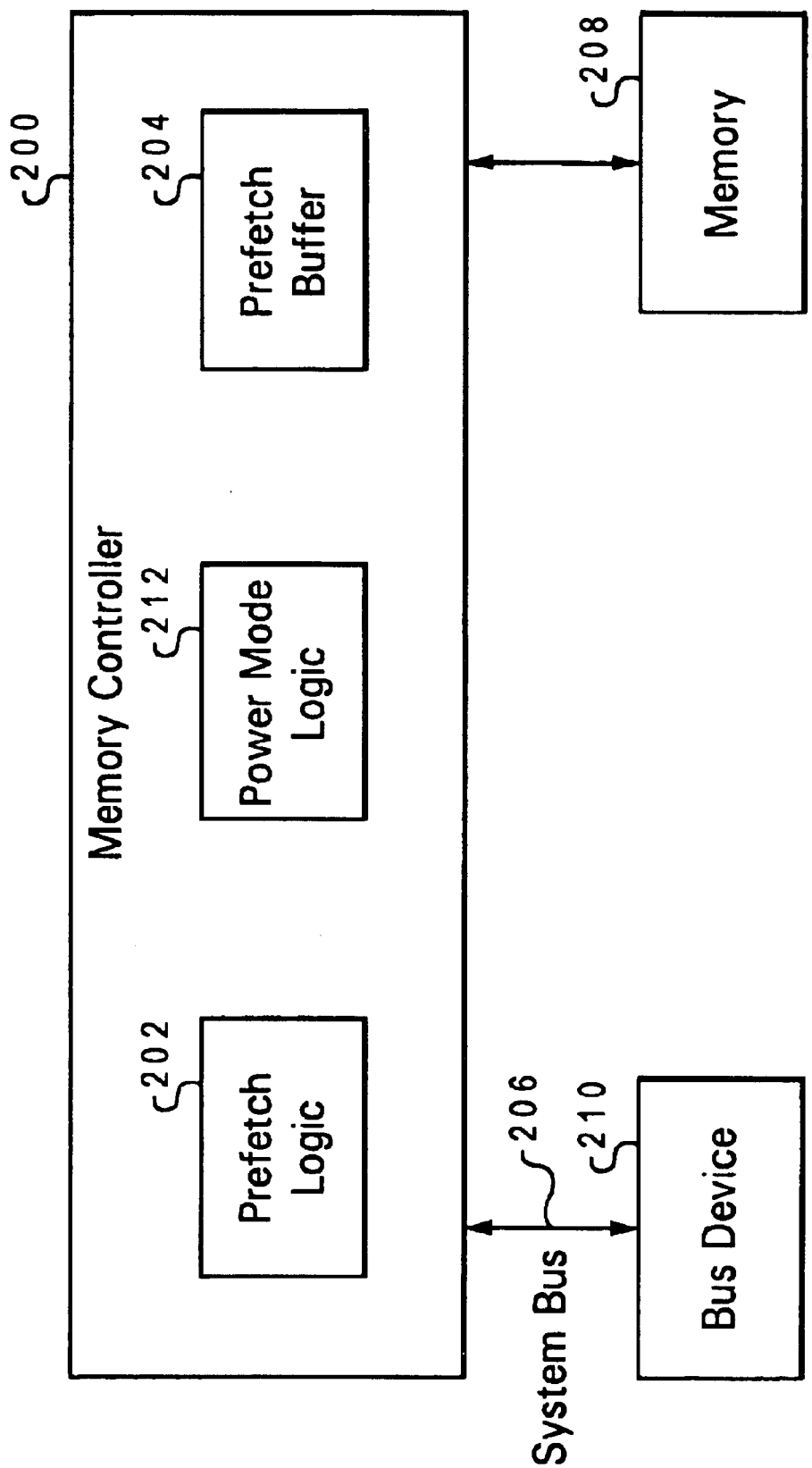
FIG. 2 is a block diagram of a memory controller for implementing the present invention.

Referring now to FIG. 2, a block diagram of a memory controller for implementing the present invention is illustrated. Memory Controller 200 contains prefetch buffer 204 and prefetch logic 202. Memory controller 200 is logically connected to memory 208. Additionally, memory controller 200 is connected via system bus 206 to a bus device 210. Bus device 210 can be a processor, peripheral, or other device that may be connected to a system bus.

Memory 208 may operate in an active power state and an inactive power state to reduce power consumption. In an inactive power state, memory 208 retains its contents but may not be readily accessed by outside components.

Prefetch Logic 202 predicts future memory requests and loads those requests into prefetch buffer 204. In a preferred embodiment, prefetch logic 202 is implemented in hardware, but those of skill in the art understand prefetch logic may be implemented in hardware, software, or a combination of both. The algorithm employed by prefetch logic 202 may be any algorithm known in the art for predicting future memory accesses.

Prefetch buffer 204 caches memory locations that prefetch logic 202 anticipates will be accessed. In a preferred embodiment, prefetch buffer 204 contains a portion allocated to buffer read requests and another portion to buffer write requests.

Power mode logic 212 controls the power state of the memory logically connected to the memory controller. Power mode logic ensure the memory is in an active power state when a memory request can not be satisfied from prefetch buffer 204 and memory 208 must be accessed. In one embodiment, power mode logic 212 changes the power state of memory 208 to active when a request can not be satisfied from prefetch buffer 204. Following the retrieval of the data from memory, power mode logic 212 returns memory 208 to an inactive power mode. In yet another embodiment, power mode logic intelligently delays returning memory 208 to a reduced power state based on the likelihood of a subsequent memory request miss or based on the passage of a certain amount of time.

Figure 3:
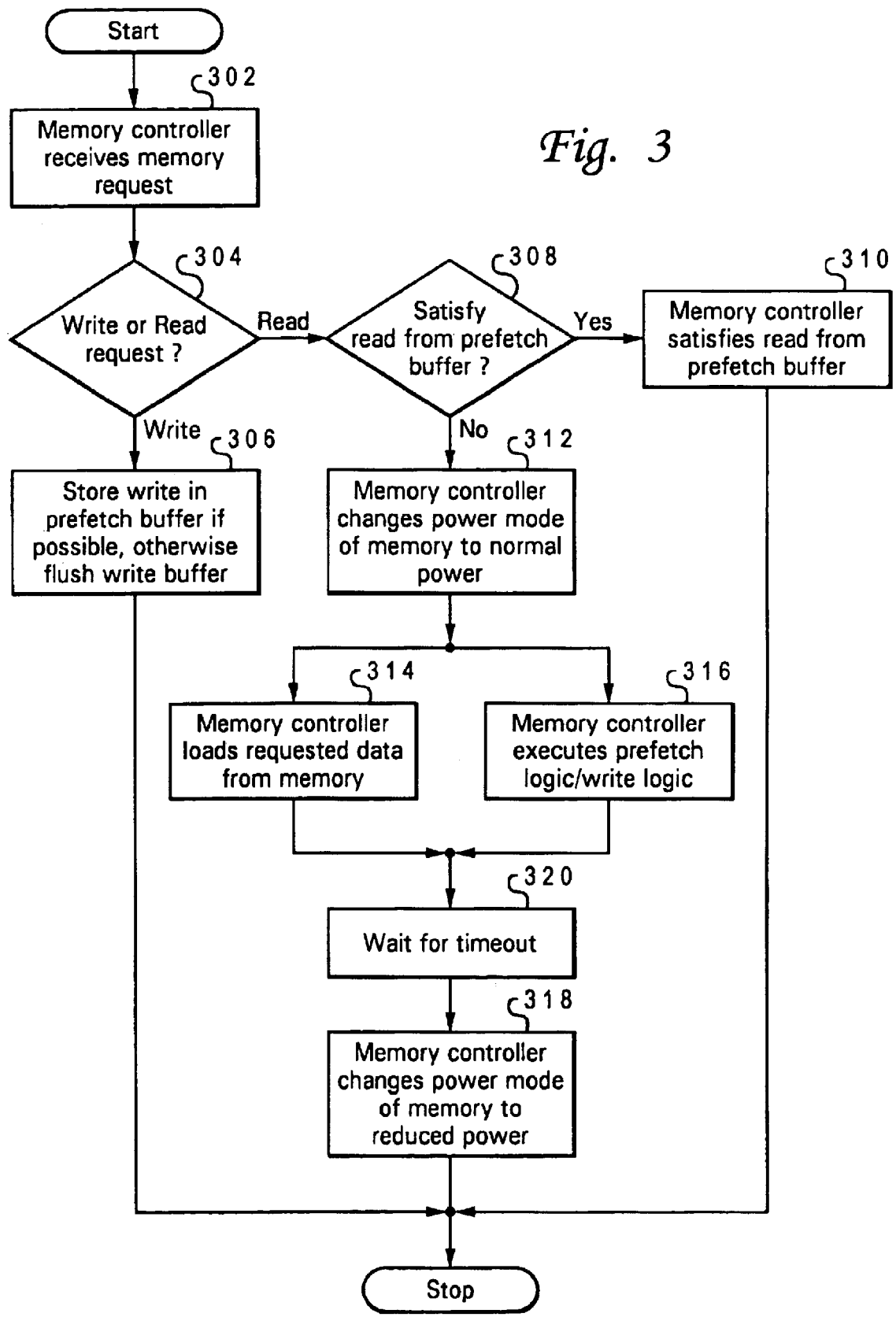
FIG. 3 is a flow chart depicting a set of steps for satisfying memory requests while minimizing memory power consumption.

With reference now to FIG. 3, a flow chart of a set of steps for carrying out the present invention is depicted. The process begins with a memory controller receiving a memory request as illustrated at step 302. The memory request may be a read or write operation to memory. If the request is a write as determined in decision step 304, the process continues to step 306 which depicts the memory controller buffering the write in the prefetch buffer. In the preferred embodiment described in FIG. 3, the buffered write request is committed to memory the next time the memory power state is changed to active as is described in conjunction with step 316. Those skilled in the art will readily recognize that the memory controller must determine if adequate space exists in the prefetch buffer for the write. If there is insufficient space, the pending writes may be committed to memory.

If the memory request is a read request as decided at step 304, the process advances to step 308 which illustrates the memory controller determining if the read request may be satisfied from the prefetch buffer. If the request may be satisfied from the prefetch buffer, the memory controller satisfies the read from the prefetch buffer as depicted at step 310.

Should the memory controller be unable to satisfy the read request from the prefetch buffer, the process continues to step 312 which illustrates the memory controller changing the power mode of the memory to an active power level. After the memory is set to an active power state, two actions occur in parallel. The first action is depicted in step 314 with the memory controller loading the requested data from memory. The second action is illustrated at step 316 with the memory controller executing the prefetch logic to load memory addresses that are likely to requested in the future. Additionally, the memory controller commits pending write operations to memory if needed.

Following the completion of steps 314 and 316, the process continues to step 320 which depicts the memory controller waiting for a certain period of time before changing the power mode of memory to a reduced, or inactive power state. The timeout at step 320 may be zero in a simple embodiment of the present invention, or may be a period of time selected based upon the likelihood of a future memory request miss. Following step 320, the process continues to step 318 which depicts the memory controller changing the power mode of memory to a reduced power state.

Those skilled in the art will readily understand that variation in the procedure described above may be made while still achieving a similar result. Specifically, the memory need not be put in an inactive power mode immediately after it is accessed. Additional logic may be employed to intelligently place the memory into an inactive power mode after a certain period of time.

The embodiments and examples set forth herein are presented in order to best explain the present invention and its practical application and, thereby, to enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A computer system with reduced power consumption and improved performance, said computer system comprising:

a memory controller;

a memory logically connected to said memory controller, wherein said memory may be placed in a plurality of power modes;

a prefetch logic associated with said memory controller for anticipating future memory requests;

a prefetch buffer associated with said memory controller for storing anticipated memory requests; and a power mode logic associated with said memory controller for selectively enabling said plurality of power modes in response to content within said prefetch buffer.

2. The computer system of claim 1, wherein said power mode logic performs the steps of:

determining if said memory request may be satisfied from a prefetch buffer associated with said memory controller;

in response to determining that said memory request may be satisfied from said prefetch buffer, satisfying said memory request from said prefetch buffer; and in response to determining that said memory request may not be satisfied from said prefetch buffer:

changing the power mode of said memory to an active power state if said memory is not already in said active power state; and changing the power mode of said memory to an inactive power state at a time subsequent to said memory request being satisfied.

3. The computer system of claim 2, wherein the step of in response to determining that said memory request may not be satisfied from said prefetch buffer further comprises:

utilizing said prefetch logic to load memory data into said prefetch buffer.

4. The computer system of claim 2, wherein the step of in response to determining that said memory request may not be satisfied from said prefetch buffer further comprises:
   satisfying said memory request from said memory.

5. The computer system of claim 3, wherein the step of in response to determining that said memory request may not be satisfied from said prefetch buffer further comprises:
   satisfying said memory request from said prefetch buffer.

6. A memory controller with reduced power consumption and improved performance that is logically connected to a memory having a plurality of power modes, said memory controller comprising:
   a prefetch logic associated with said memory controller for anticipating future memory requests;
   a prefetch buffer associated with said memory controller for storing anticipated memory requests; and
   a power mode logic associated with said memory controller for selectively enabling said plurality of power modes in response to content within said prefetch buffer.

7. The memory controller of claim 6, wherein said power mode logic performs the steps of:
   determining if said memory request may be satisfied from a prefetch buffer associated with said memory controller;
   in response to determining that said memory request may be satisfied from said prefetch buffer, satisfying said memory request from said prefetch buffer; and
   in response to determining that said memory request may not be satisfied from said prefetch buffer:
      changing the power mode of said memory to an active power state if said memory is not already in said active power state; and
      changing the power mode of said memory to an inactive power state at a time subsequent to said memory request being satisfied.

8. The memory controller of claim 7, wherein the step of in response to determining that said memory request may not be satisfied from said prefetch buffer further comprises:
   utilizing said prefetch logic to load memory data into said prefetch buffer.

9. The memory controller of claim 8, wherein the step of in response to determining that said memory request may not be satisfied from said prefetch buffer further comprises:
   satisfying said memory request from said memory.

10. The memory controller of claim 8, wherein the step of in response to determining that said memory request may not be satisfied from said prefetch buffer further comprises:
    satisfying said memory request from said prefetch buffer.

11. A method of reducing memory power usage and increasing memory performance, said method comprising the steps of:
    receiving a memory request at a memory controller logically connected to a memory;
    determining if said memory request may be satisfied from a prefetch buffer associated with said memory controller;
    in response to determining that said memory request may be satisfied from said prefetch buffer, satisfying said memory request from said prefetch buffer;
    in response to determining that said memory request may not be satisfied from said prefetch buffer:
       changing the power mode of said memory to an active power state if said memory is not already in said active power state;
       changing the power mode of said memory to an inactive power state at a time subsequent to said memory request being satisfied.

12. The method of claim 11, wherein the step of in response to determining that said memory request may not be satisfied from said prefetch buffer further comprises:
    performing a prefetch algorithm to load memory data into said prefetch buffer.

13. The method of claim 11, wherein the step of in response to determining that said memory request may not be satisfied from said prefetch buffer further comprises:
    satisfying said memory request from said memory.

14. The method of claim 12, wherein the step of in response to determining that said memory request may not be satisfied from said prefetch buffer further comprises:
    satisfying said memory request from said prefetch buffer.

* * * * *